3,333,092
ALTERNATING CURRENT INTEGRATORS
Arthur A. Hauser, Jr., Sudbury, Mass., assignor to Sperry Rand Corporation, Great Neck, N.Y., a corporation of Delaware
Filed July 14, 1964, Ser. No. 382,449
6 Claims. (Cl. 235—183)

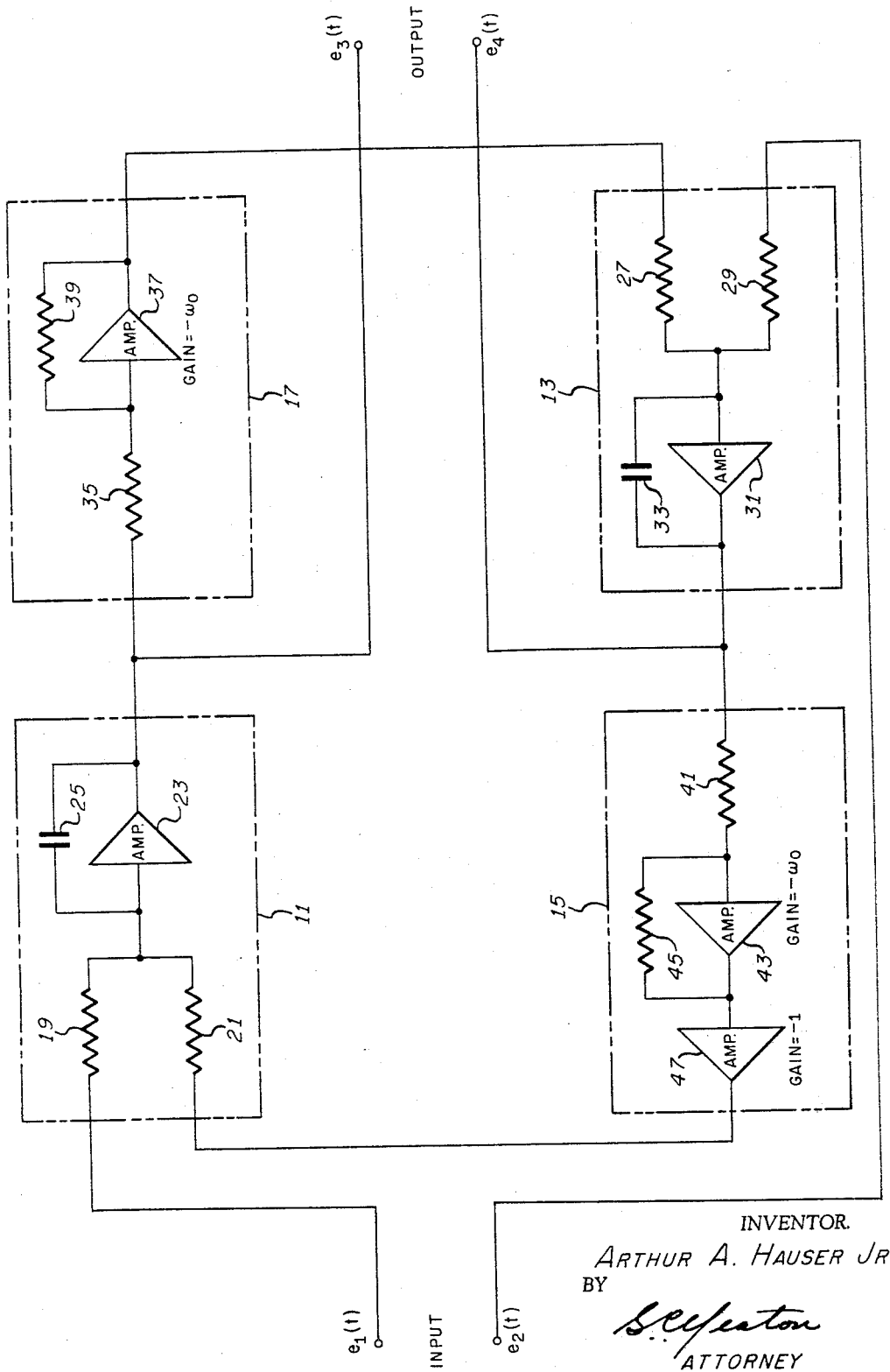

This invention relates to analog computer components and more particularly to integrator circuits for use in alternating current analog computers.

Integrator circuits for use in direct current analog computers are well-known in the art. These integrator circuits usually are made in the form of a high gain amplifier with capacitive feedback. They produce an output voltage whose amplitude is proportional to the sum of two component voltages. The first of these component voltages represents the integral of the amplitude of the input voltage. The second of these component voltages is a constant voltage which represents the constant of integration. These circuits, however, are unsuitable for use in alternating current analog computers since no meaning can be assigned to the constant voltage in the alternating current sense. An alternating current computer has no provision for interpreting such constant voltages.

As opposed to a direct current integrator, an alternating current integrator must provide a constant of integration which has meaning in the alternating current sense, that is the constant of integration must be capable of interpretation in the alternating current circuits of the computer.

Alternating current analog computers employ a modulated carrier signal to represent the information under consideration. The information is contained only in the modulation. Therefore, if an integrator is to perform properly in this environment, it must be capable of integrating the modulation signal without disturbing the carrier. This requirement has been satisfied only approximately in known prior art devices, and the approximations made are acceptable only when the highest frequency component in the modulation signal is considerably less than the carrier frequency.

The present invention represents an alternating current integrator useful in simulators which perform calculations using the vector properties of alternating current voltages and hence have available at all times both modulated sine and modulated cosine carriers. The integrator, therefore, must be capable of accepting a pair of modulated carriers that are in time quadrature with each other.

Expressed mathematically, the alternating current integrator of the invention must accept as inputs both $$x(t) \sin \omega_0 t$$

and $x(t) \cos \omega_0 t$ signals and produce as outputs both the quantities $$\sin \omega_0(t)[\int x(t)dt + A]$$

and $$\cos \omega_0(t)[\int x(t)dt + B]$$

where $\omega_0$ is the angular frequency of the carrier in radians per second; A and B are constants.

It is an object of the present invention to provide an alternating current integrator circuit capable of yielding an integrated output signal that can be interpreted by the circuits of an alternating current analog computer.

It is another object of the present invention to provide an alternating current integrator circuit that will yield accurate results regardless of the frequency ratio between the applied modulation and carrier signals.

The construction and mode of operation of a circuit embodying the invention may be understood by reference to the following description taken in connection with the accompanying drawing in which the single figure depicts a presently preferred circuit for practicing the invention.

The signals involved in the computation with the integrator of the invention may be expressed in a generalized form. The input signals may be designated as $e_1(t)$ and $e_2(t)$ and defined as follows:

$$\left. \begin{array}{l} e_1(t) = x_1(t) \sin \omega_0 t + x_2(t) \cos \omega_0 t \\ e_2(t) = x_1(t) \cos \omega_0 t - x_2(t) \sin \omega_0 t \end{array} \right\} \quad (1)$$

Similarly, the output signals may be designated as $e_3(t)$ and $e_4(t)$ and defined as:

$$\left. \begin{array}{l} e_3(t) = \sin \omega_0 t \left[ \int_0^t x_1(s)ds + A_1 \right] + \\ \qquad \cos \omega_0 t \left[ \int_0^t x_2(s)ds + A_2 \right] \\ e_4(t) = \cos \omega_0 t \left[ \int_0^t x_1(s)ds + A_1 \right] - \\ \qquad \sin \omega_0 t \left[ \int_0^t x_2(s)ds + A_2 \right] \end{array} \right\} \quad (2)$$

where $A_1$ and $A_2$ are constants. It will be noticed that the less general case previously mentioned will be obtained if $x_2(t)$ is taken to be zero and $A_2$ is suppressed.

Consider the form of the equations that would be obtained by integrating the individual terms of the right hand side of the Equations 1. Integrating by parts:

$$\left. \begin{array}{l} \int x(t) \sin \omega_0 t \, dt = \sin \omega_0 t \int x(t)dt - \\ \qquad \omega_0 \int [\cos \omega_0 t \int x(t)dt]dt \\ \int x(t) \cos \omega_0 t \, dt = \cos \omega_0 t \int x(t)dt + \\ \qquad \omega_0 \int [\sin \omega_0 t \int x(t)dt]dt \end{array} \right\} \quad (3)$$

These may be written in the form:

$$\left. \begin{array}{l} \sin \omega_0 t \int x(t)dt = \int [x(t) \sin \omega_0 t + \omega_0 \cos \omega_0 t \int x(t)dt]dt \\ \cos \omega_0 t \int x(t)dt = \int [x(t) \cos \omega_0 t - \omega_0 \sin \omega_0 t \int x(t)dt]dt \end{array} \right\} \quad (4)$$

By letting $x(t) = x_1(t)$ and $x_2(t)$ as required, and substituting Equation 4 in Equation 2, it will follow that:

$$\left. \begin{array}{l} e_3(t) = \int [e_1(t) + \omega_0 e_4(t)]dt \\ e_4(t) = \int [e_2(t) - \omega_0 e_3(t)]dt \end{array} \right\} \quad (5)$$

The mathematical operations indicated by the Equation 5 will be performed by the circuit depicted in the accompanying figure in which a pair of direct current summing integrators 11 and 13 are connected in a closed loop arrangement together with a pair of multipliers 15 and 17. Summing integrators and multipliers of this type are described in the literature. See, for instance, Chapter I of "Electronic Analog Computers" written by Korn and Korn and published by McGraw-Hill Book Company, New York, 1952.

In brief, the integrator 11 contains a pair of input resistors 19 and 21 through which signals are fed to a high gain direct current amplifier 23. A feedback capacitor 25 completes the integrator. The output of the integrator 11 is equivalent to the time integral of the sum of the individual input signals.

Similarly, the integrator 13 contains a pair of input resistors 27 and 29 through which input signals pass to a high gain direct current amplifier 31 which is shunted by a feedback capacitor 33.

The multiplier 17 contains an input resistor 35 through which input signals pass to a direct current amplifier 37. A feedback resistor 39 is shunted around the amplifier. The multiplier 17 amplifies the signal by an amount numerically equal to the angular frequency of the carrier and inverts the phase of this signal as well.

Similarly, a multiplier 15 includes an input resistor 41 through which input signals pass to a direct current amplifier 43 which is provided with a feedback resistor 45. The combination of the amplifier 43 and the resistors 41 and 45 provides a gain numerically equal to the angular frequency of the carrier and inverts the phase of the signals applied to the resistor 41. A second phase inverting amplifier 47 provides unity gain but again inverts the phase of a signal so that the overall multiplier 15 effectively provides an amplification equal to the angular frequency of the carrier with no phase reversal.

As shown in the Korn and Korn reference previously cited, by using high gain direct current amplifiers, the multipliers themselves become equivalent to highly stable amplifiers having a gain substantially equal to the ratio of the resistance of the feedback resistor to the resistance of the input resistor.

In use, one modulated carrier wave is applied to an input terminal $e_1(t)$ and the other modulated carrier wave is applied to the input terminal $e_2(t)$. The signal from the input terminal $e_1(t)$ is added algebraically to the signal from the multiplying means 15 in a summing network comprising the resistors 19 and 21. The output from the direct current integrator 11 is applied to an output terminal $e_3(t)$ and to the amplifying means 17. The output of this amplifying means is added algebraically to the modulated carrier wave applied to the input terminal $e_2(t)$ in a summing network comprised of the resistors 27 and 29. The signal from this summing network is integrated in the integrator 13 and applied to the output terminals $e_4(t)$ as well as the amplifying means 15.

It will be noticed that no assumptions were made in the foregoing description relating to the relative frequencies of the carrier waves and the modulating signals. The relative frequencies of the modulating signal and the carriers are immaterial. As long as the direct current amplifiers can pass the frequency components in the total input signal, precision integration of the modulation will be attained.

It will be appreciated that circuits containing combinations of the alternating current integrators of the invention may be employed to solve particular differential equations. For instance, individual alternating current integrators may be connected in cascade to solve differential equations of higher order. In general, the number of such integrators required will be equal to the order of the particular differential equation. Coefficients of the various terms in the equation can be simulated by combining a sample of the output voltage of the appropriate stages with an analog signal representing the particular coefficient, and feeding the resulting signal back to the input of the first alternating current integrator.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A device for integrating a modulation signal existing on a pair of carrier waves having an annular frequency of $\omega_0$ and being in time quadrature with each other comprising first and second direct current summing integrators; a first amplifying means having a voltage gain equal to $-\omega_0$; a second amplifying means having a voltage gain equal to $+\omega_0$; signal input means for applying the first and second of said pair of modulated carrier waves to the first and second summing integrators respectively; means for applying the outputs of the first and second summing integrators to the first and second amplifying means respectively; means for applying the outputs of the first and second amplifying means to the second and the first summing integrators respectively; and individual output means connected to the output of each summing integrator.

2. A device for integrating a modulation signal existing on a pair of carrier waves in time quadrature with each other comprising first and second summing integrators; first and second amplifying means each having a gain numerically equal to the angular frequency of the carrier waves to be used, said first amplifying means being further arranged to invert the phase of the signals applied to its input; means to couple the output of the first integrator to the input of the first amplifying means; means to couple the output of the second integrator to the input of the second amplifying means; means to apply the instantaneous sum of the first of said carrier waves and the output of the second amplifying means to the input of the first integrator; means to apply the instantaneous sum of the second of said carrier waves and the output of the first amplifying means to the input of the second integrator; and means for applying the output of each summing integrator to an external circuit.

3. A device for integrating a modulation signal existing on a pair of carrier waves that are in time quadrature with each other comprising first and second direct current integrating circuits; means to apply the first of said pair of carrier waves to the first direct current integrating circuit; means to apply the second of said pair of carrier waves to the second direct current integrating circuit; a first amplifying means connected between the output of the first direct current integrating circuit and the input of the second direct current integrating circuit; a second amplifying means connected between the output of the second direct current integrating circuit and the input of the first direct current integrating circuit; said amplifying means each having a gain numerically equal to the angular frequency of the carrier waves to be received; said first amplifying means further being constructed to invert the phase of the signals being amplified; and individual signal output means on each direct current integrating circuit.

4. A device for integrating a modulation signal existing on a pair of carrier waves in time quadrature with each other comprising first and second direct current integrating means; first amplifying means to invert and multiply the signal from the first integrating means by a factor numerically equal to the angular frequency of the carrier waves; second amplifying means to multiply the signal from the second integrating means by a factor equal to the angular frequency of the carrier waves; means to supply the algebraic sum of the first of said pair of carrier waves and the output of said second amplifying means to said first integrating means; and means to supply the algebraic sum of the second of said pair of carrier waves and the output of said first amplifying means to said second integrating means.

5. A device for integrating the modulation appearing on first and second carrier waves that are in time quadrature with each other comprising first and second input terminals to receive the first and second carrier waves respectively; first and second output terminals; a first amplifying means to invert and amplify signals appearing on the first output terminal; a second amplifying means to amplify the signals appearing on the second output terminal, each of said amplifying means having a gain numerically equal to the angular frequency of the carrier waves; a first summing means to add the instantaneous algebraic values of the signals appearing on the first input terminal and the second amplifying means; a second summing means to add the instantaneous algebraic values of the signals appearing on the second input terminal and the first amplifying means; first and second means to integrate the output signals from the first and second summing means respectively; and first and second means to connect the output of the first and second integrating means to the first and second output terminals respectively.

6. A device for integrating the modulation appearing on a pair of carrier waves in time quadrature with each other comprising first and second input terminals to receive the first and second carrier waves respectively; first and second output terminals for supplying a pair of output voltages; first amplifying means to invert and multiply the voltage appearing on the first output terminal by a factor numerically equal to the angular frequency of the carrier waves; second amplifying means to multiply the voltage appearing on the second output terminal by a factor numerically equal to the angular frequency of the carrier waves; first summing means to add the instantaneous values of the signals on the first input terminal to the output signal from the second amplifying means; second summing means to add the instantaneous values of the signals on the second input terminal to the output of the first amplifying means; first integrating means to integrate the output of said first summing means; means to connect the output of said first integrataing means to the first output terminal; second integrating means to integrate the output of said second summing means; and means to connect the output of said second integrating means to the second output terminal.

References Cited

UNITED STATES PATENTS

| | | | |
|---|---|---|---|
| 2,846,577 | 7/1958 | Blasingame | 235—183 X |
| 2,969,182 | 1/1961 | Savet | 235—183 |
| 3,028,504 | 4/1962 | Close | 235—189 X |

OTHER REFERENCES

Instruments and Automation, "Derivative Via Integration," vol. 31, No. 9, page 1525 (1958).

MALCOLM A. MORRISON, *Primary Examiner.*

T. J. PAINTER, *Examiner.*